United States Patent [19]

Huang et al.

[11] Patent Number: 6,076,056
[45] Date of Patent: Jun. 13, 2000

[54] SPEECH RECOGNITION SYSTEM FOR RECOGNIZING CONTINUOUS AND ISOLATED SPEECH

[75] Inventors: Xuedong D. Huang; Fileno A. Alleva, both of Redmond; Li Jiang, Bellevue; Mei-Yuh Hwang, Redmond, all of Wash.

[73] Assignee: Microsoft Corporation, Redmond, Wash.

[21] Appl. No.: 08/934,622

[22] Filed: Sep. 19, 1997

[51] Int. Cl.⁷ .................................................. G10L 15/14
[52] U.S. Cl. ............................................ 704/254; 704/256
[58] Field of Search .................................. 704/256, 251, 704/252, 231, 240, 242, 254, 249, 200, 245, 238, 239

[56] References Cited

U.S. PATENT DOCUMENTS

| | | | |
|---|---|---|---|
| 4,783,808 | 11/1988 | Doddington et al. ...................... | 381/43 |
| 5,193,142 | 3/1993 | Zhao ........................................ | 704/200 |
| 5,280,563 | 1/1994 | Ganong ................................... | 704/200 |
| 5,450,523 | 9/1995 | Zhao ........................................ | 704/243 |
| 5,455,790 | 10/1995 | Bahl et al. .............................. | 704/236 |
| 5,502,790 | 3/1996 | Yi ............................................ | 704/256 |
| 5,526,463 | 6/1996 | Gillick et al. ........................... | 395/2.6 |
| 5,794,192 | 8/1998 | Zhao ........................................ | 704/244 |

FOREIGN PATENT DOCUMENTS 0 202 534   11/1986   European Pat. Off. .......... G10L 5/06

OTHER PUBLICATIONS

"A Tutorial on Hidden Markov Models and Selected Applications in Speech Recognition", by Lawrence R. Rabiner, *Proceedings of the IEEE*, vol. 77, No. 2, Feb. 1989, pp. 257–285.

"Multi–Style Training For Robust Isolated–Word Speech Recognition", by Richard P. Lippmann, Edward A. Martin and Douglas B. Paul, 1987, *IEEE*, pp. 705–708.

"Predicting Unseen Triphones With Senones", by Mei–Yuh Hwang, Xuedong Huang, and Fileno Alleva, Apr. 1993, vol. 2, pp. 11–311–314, Institute of Electrical Engineers.

"Microsoft Windows Highly Intelligent Speech Recognizer: Whisper", by Xuedong Huang, Alex Acero, Fil Alleva, Mei–Yuh Hwang, Li Jiang and Milind Mahajan, 1995, *IEEE*, pp. 93–96.

X. Huang, A. Acero, F. Alleva, M. Hwang, L. Jiang, and M. Mahajan. "From Spinx–II to Whisper–Making Speech Recognition Usable". *Speech and Speaker Recognition–Advanced Topics*, Kulwer Publisher, 1994.

"Predicting Unseen Triphones with Senones", by Mei–Yuh Hwang, Xuedong Huang, and Fileno A. Alleva, *IEEE Transactions On Speech and Audio Processing*, vol. 4, No. 6, Nov. 1996, pp. 412–419.

Lippmann, E.A. Martin, D.P. Paul, "Multi–Style Training for Robust Isolated–Word Recognition", *Proceedings of DARPA Speech Recognition Workshop*, Mar. 24–26, 1987, pp. 96–99.

Proceedings of the IEEE, Lippmann et al., "Multi–Style Training for Robust Isolated–Word Speech Recognition", pp. 705–708, 1987.

IEE, Hwang et al., "Predicting Unseen Triphones With Semones". vol. 2, pp. 311–314, Apr. 1993.

*Primary Examiner*—Richemond Dorvil
*Attorney, Agent, or Firm*—Joseph R. Kelly; Westman, Champlin & Kelly, P.A.

[57] ABSTRACT

Speech recognition is performed by receiving isolated speech training data indicative of a plurality of discretely spoken training words, and receiving continuous speech training data indicative of a plurality of continuously spoken training words. A plurality of speech unit models is trained based on the isolated speech training data and the continuous speech training data. Speech is recognized based on the speech unit models trained.

23 Claims, 10 Drawing Sheets

SPEECH RECOGNITION SYSTEM FOR RECOGNIZING CONTINUOUS AND ISOLATED SPEECH

BACKGROUND OF THE INVENTION

The present invention relates to computer speech recognition. More particularly, the present invention relates to a method of recognizing both continuous and isolated speech.

The most successful current speech recognition systems employ probabilistic models known as hidden Markov models (HMMs). A hidden Markov model includes a plurality of states, wherein a transition probability is defined for each transition from each state to every other state, including transitions to the same state. An observation is probabilistically associated with each unique state. The transition probabilities between states (the probabilities that an observation will transition from one state to the next) are not all the same. Therefore, a search technique, such as a Viterbi algorithm, is employed in order to determine a most likely state sequence for which the overall probability is maximum, given the transition probabilities between states and observation probabilities.

In current speech recognition systems, speech has been viewed as being generated by a hidden Markov process. Consequently, HMMs have been employed to model observed sequences of speech spectra, where specific spectra are probabilistically associated with a state in an HMM. In other words, for a given observed sequence of speech spectra, there is a most likely sequence of states in a corresponding HMM.

This corresponding HMM is thus associated with the observed sequence. This technique can be extended, such that if each distinct sequence of states in the HMM is associated with a sub-word unit, such as a phoneme, then a most likely sequence of sub-word units can be found. Moreover, using models of how sub-word units are combined to form words, then using language models of how words are combined to form sentences, complete speech recognition can be achieved.

When actually processing an acoustic signal, the signal is typically sampled in sequential time intervals called frames. The frames typically include a plurality of samples and may overlap or be contiguous. Each frame is associated with a unique portion of the speech signal. The portion of the speech signal represented by each frame is analyzed to provide a corresponding acoustic vector. During speech recognition, a search of speech unit models is performed to determine the state sequence most likely to be associated with the sequence of acoustic vectors.

In order to find the most likely sequence of states corresponding to a sequence of acoustic vectors, the Viterbi algorithm may be employed. The Viterbi algorithm performs a computation which starts at the first frame and proceeds one frame at a time, in a time-synchronous manner. A probability score is computed for each state in the state sequences (i.e., in the HMMs) being considered. Therefore, a cumulative probability score is successively computed for each of the possible state sequences as the Viterbi algorithm analyzes the acoustic signal frame by frame. By the end of an utterance, the state sequence (or HMM or series of HMMs) having the highest probability score computed by the Viterbi algorithm provides the most likely state sequence for the entire utterance. The most likely state sequence is then converted into a corresponding spoken subword unit, word, or word sequence.

The Viterbi algorithm reduces an exponential computation to one that is proportional to the number of states and transitions in the model and the length of the utterance. However, for a large vocabulary, the number of states and transitions becomes large and the computation required to update the probability score at each state in each frame for all possible state sequences takes many times longer than the duration of one frame, which is typically approximately 10 milliseconds in duration.

Thus, a technique called pruning, or beam searching, has been developed to greatly reduce computation needed to determine the most likely state sequence. This type of technique eliminates the need to compute the probability score for state sequences that are very unlikely. This is typically accomplished by comparing, at each frame, the probability score for each remaining state sequence (or potential sequence) under consideration with the highest score associated with that frame. If the probability score of a state for a particular potential sequence is sufficiently low (when compared to the maximum computed probability score for the other potential sequences at that point in time) the pruning algorithm assumes that it will be unlikely that such a low scoring state sequence will be part of the completed, most likely state sequence. The comparison is typically accomplished using a minimum threshold value. Potential state sequences having a score that falls below the minimum threshold value are removed from the searching process. The threshold value can be set at any desired level, based primarily on desired memory and computational savings, and a desired error rate increase caused by memory and computational saving. The retained state sequences will be referred to as the active-hypotheses.

Another conventional technique for further reducing the magnitude of computation required for speech recognition includes the use of a prefix tree. A prefix tree represents the lexicon of the speech recognition system as a tree structure wherein all of the words likely to be encountered by the system are represented in the tree structure.

In such a prefix tree, each subword unit (such as a phoneme) is typically represented by a branch which is associated with a particular acoustic model (such as an HMM). The phoneme branches are connected, at nodes, to subsequent phoneme branches. All words in the lexicon which share the same first phoneme share the same first branch. All words which have the same first and second phonemes share the same first and second branches. By contrast, words which have a common first phoneme, but which have different second phonemes, share the same first branch in the prefix tree but have second branches which diverge at the first node in the prefix tree, and so on. The tree structure continues in such a fashion such that all words likely to be encountered by the system are represented by the end nodes of the tree (i.e., the leaves on the tree).

It is apparent that, by employing a prefix tree structure, the number of initial branches will be far fewer than the typical number of words in the lexicon or vocabulary of the system. In fact, the number of initial branches cannot exceed the total number of phonemes (approximately 40–50), regardless of the size of the vocabulary or lexicon being searched. Although if allophonic variations are used, then the initial number of branches could be large, depending on the allophones used.

Speech recognition systems employing the above techniques can typically be classified in two types. The first type is a continuous speech recognition (CSR) system which is capable of recognizing fluent speech. The CSR system is trained (i.e., develops acoustic models) based on continuous speech data in which one or more readers read training data into the system in a continuous or fluent fashion. The acoustic models developed during training are used to recognize speech.

The second type of system is an isolated speech recognition (ISR) system which is typically employed to recognize only isolated speech (or discreet speech). The ISR system is trained (i.e., develops acoustic models) based on discrete or isolated speech data in which one or more readers are asked to read training data into the system in a discrete or isolated fashion with pauses between each word. An ISR system is also typically more accurate and efficient than continuous speech recognition systems because word boundaries are more definite and the search space is consequently more tightly constrained. Also, isolated speech recognition systems have been thought of as a special case of continuous speech recognition, because continuous speech recognition systems generally can accept isolated speech as well. They simply do not perform as well when attempting to recognize isolated speech.

It has been observed that users of CSR systems typically tend to speak fluently until the system begins to make errors, or until the users are pondering the composition of the document. At that point, the user may slow down, often to the point of pausing between words. In both cases, the user believes that, by speaking more slowly and distinctly, with pauses between words, the user will assist the recognition system, when in fact the user is actually stressing the system beyond its capabilities.

It is not adequate, however, simply to attempt to recognize continuous speech with an isolated speech recognition system. ISR systems typically perform much worse than CSR systems when attempting to recognize continuous speech. This is because there is no crossword coarticulation in the ISR training data.

SUMMARY OF THE INVENTION

Speech recognition is performed by receiving isolated speech training data indicative of a plurality of discretely spoken training words, and receiving continuous speech training data indicative of a plurality of continuously spoken training words. A plurality of speech unit models is trained based on the isolated speech training data and the continuous speech training data. Speech is recognized based on the speech unit models trained.

In one preferred embodiment, pauses in the speech to be recognized are identified to determine a phrase duration. A plurality of phrase hypotheses are generated which are indicative of likely phrases represented by the input data between the pauses. A word duration associated with each word in each phrase hypothesis is compared with an expected word duration for a phrase having a number of words equal to the number of words in the phrase hypothesis. A score is assigned to each phrase hypothesis based on the comparison of the word duration with the expected word duration.

DETAILED DESCRIPTION OF THE PREFERRED EMBODIMENTS

Figure 1:
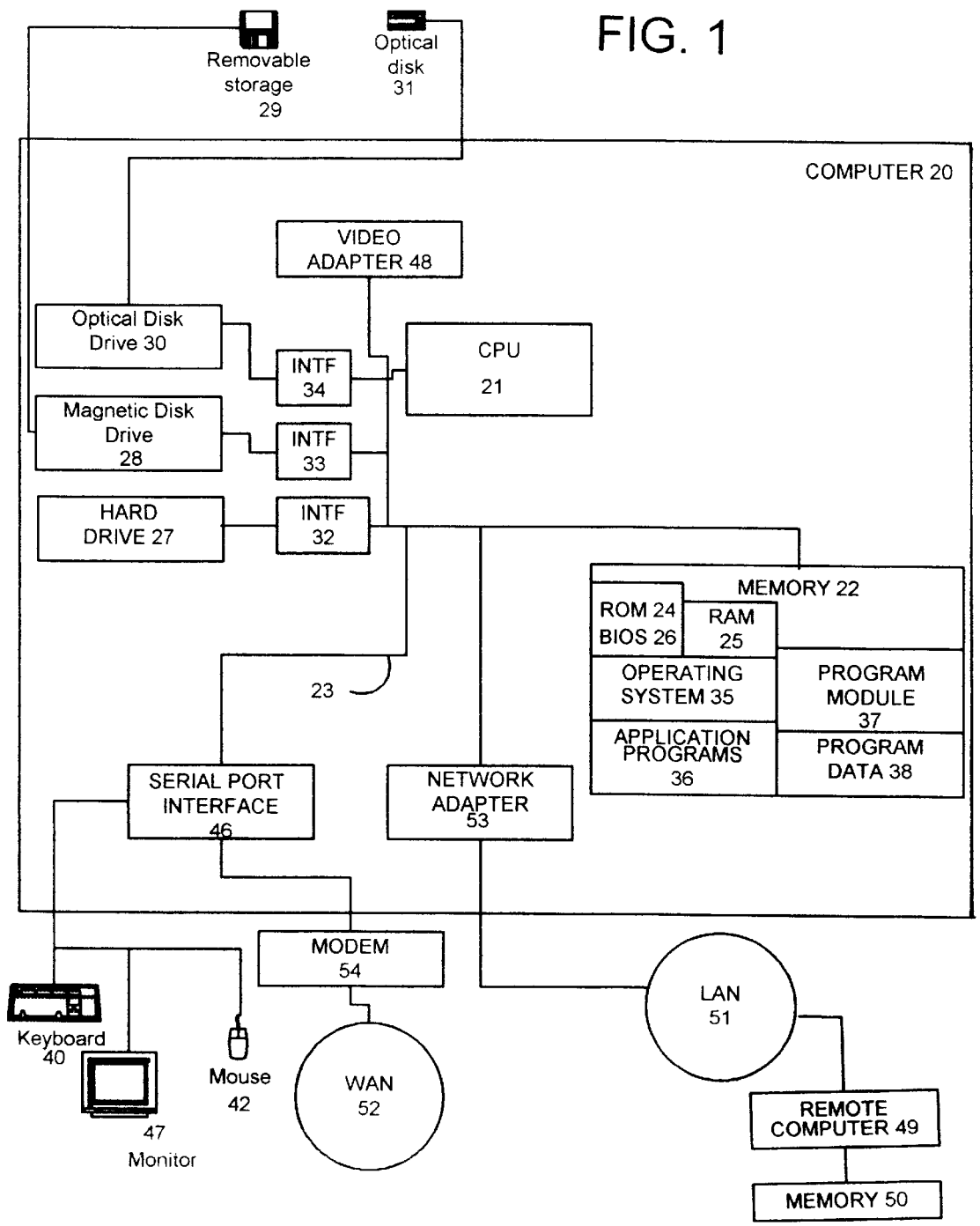
FIG. 1 is a block diagram of an exemplary environment for implementing a speech recognition system in accordance with the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown) a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor 47, personal computers may typically include other peripheral output devices (not shown), such as speakers and printers.

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Further, when the environment in FIG. 1 is implemented as a speech recognition system, other components may be desirable as well. Such components may include a microphone, sound card and speakers, some of which are described in greater detail below.

Figure 2:
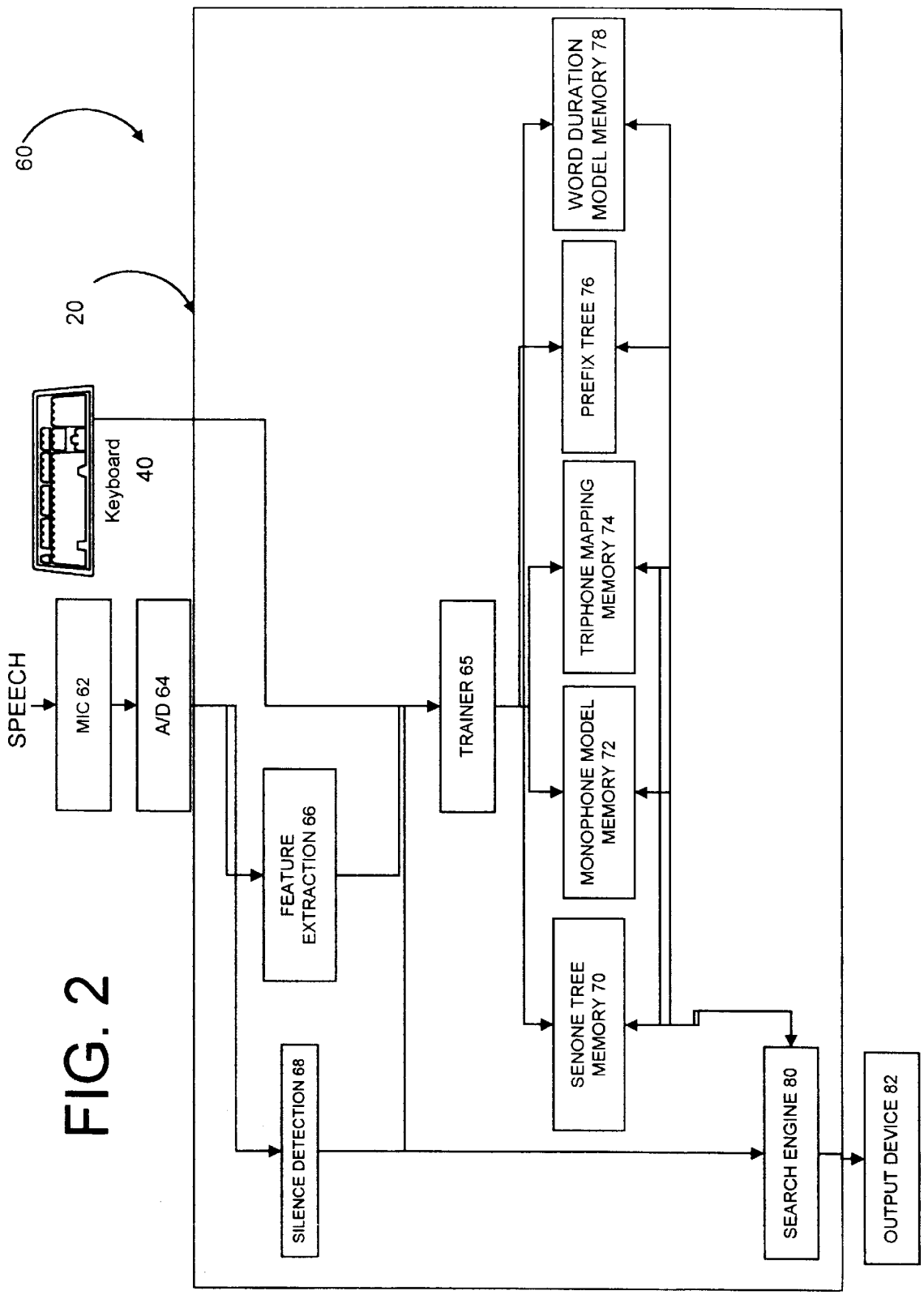
FIG. 2 is a more detailed block diagram of a portion of the system shown in FIG. 1.

FIG. 2 illustrates a block diagram of a speech recognition system 60 in accordance with one aspect of the present invention. Speech recognition system 60 includes microphone 62, analog-to-digital (A/D) converter 64, training module 65, feature extraction module 66, silence detection module 68, senone tree storage module 70, monophone model storage module 72, triphone mapping storage module 74, prefix tree storage module 76, word duration model storage model 78, search engine 80, and output device 82. It should be noted that the entire system 60, or part of system 60, can be implemented in the environment illustrated in FIG. 1. For example, microphone 62 may preferably be provided as an input device to personal computer 20, through an appropriate interface, and through A/D converter 64. Training module 65, feature extraction module 66 and silence detection module 68 may be either hardware modules in computer 20 (such as separate processors from CPU 21 or implemented in CPU 21), or software modules stored in any of the information storage devices disclosed in FIG. 1 and accessible by CPU 21 or another suitable processor. In addition, senone tree storage module 70, monophone model storage module 72, triphone mapping storage module 74, prefix tree storage module 76 and word duration model storage module 78 are also preferably stored in any suitable memory devices shown in FIG. 1. Further, search engine 80 is preferably implemented in CPU 21 (which may include one or more processors) or may be performed by a dedicated speech recognition processor employed by personal computer 20 In addition, output device 82 may, in one preferred embodiment, be implemented as monitor 47, or as a printer, or any other suitable output device.

Figure 3:
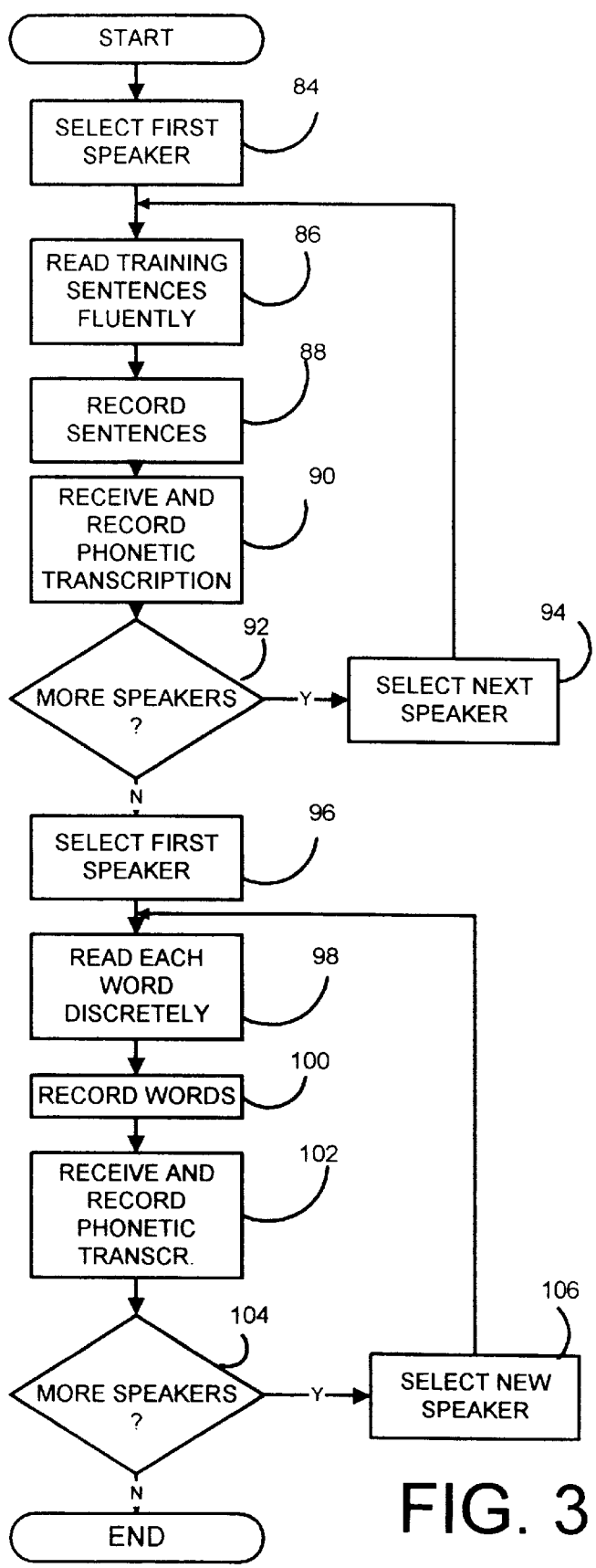
FIG. 3 is a flow diagram illustrating a data collection procedure in accordance with one aspect of the present invention.
Figure 4:
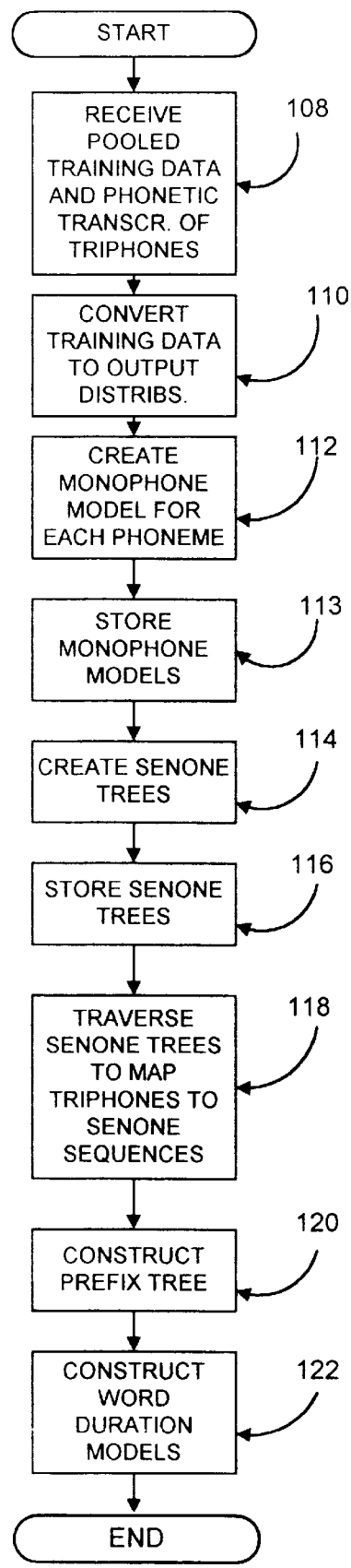
FIG. 4 is a flow diagram illustrating training of acoustic models and senone mapping using pooled training data in accordance with one aspect of the present invention.

In any case, system 60 is first trained using training data. FIGS. 3 and 4 are flow diagrams illustrating training data collection and system training procedures utilized in accordance with one preferred embodiment of the present invention. In order to train system 60, training data is first collected as described with respect to FIG. 3. In a preferred embodiment, the training data includes both continuous (or fluent) training data, in which the training words are read into system 60 by a speaker in continuous or fluent fashion, and isolated (or discrete) training data, in which training words are read into system 60 by a speaker in discrete or isolated fashion, with pauses between words.

Thus, a first speaker is selected. This is indicated by block 84. Then, the speaker is requested to read training sentences fluently into microphone 62 of system 60. This is indicated by block 86. The training sentences are recorded as indicated by block 88. Phonetic transcriptions of each training word being received by system 60 are entered into trainer 65 and system 60 by a user input device, such as keyboard 40. This is indicated by block 90. It is then determined whether additional speakers will be requested to read the training sentences as well. For speaker independent systems, multiple speakers are preferably used. However, for speaker dependent systems, multiple speakers are optional, and the training sentences may be spoken by only a single speaker.

In any case, if another speaker is to read training sentences into system 60 in a fluent manner, the new speaker is selected, and the process repeats through blocks 86, 88 and 90. This is indicated by blocks 92 and 94.

Once the continuous training data has been read into system 60, a first speaker is again selected as indicated by block 96. The selected speaker then reads into system 60 a group of training words, which are read in discrete, or isolated fashion, with pauses between each word. This is indicated by block 98. The isolated training data, in one preferred embodiment, constitutes the same words as found in the continuous training data. However, the isolated training data need not be identical to the continuous training data, and can be formed of a different set of words all together. In any case, each word is recorded by system 60, as it is read into the system. This is indicated by block 100.

Again, system 60 receives a phonetic transcription of each training word read into system 60 from the user input device, such as keyboard 40. This is indicated by block 102.

It is then determined whether additional speakers are to provide the isolated speech training data into system 60. If so, a new speaker is selected and that speaker enters the isolated speech training data in the same manner as the first. If it is determined that no additional speakers are to enter isolated training data into system 60, then the data collection process has been completed. This is indicated by blocks 104 and 106 in FIG. 3.

It should also be noted that the training data, rather than being input with speakers through a microphone, can be loaded, in the form of output distributions, directly into system 60 through an input device, such as a floppy disk drive.

As the training words are entered into system 60, through microphone 62, they are converted to digital samples by A/D converter 64 and then to feature vectors (or are quantized to codewords using vector quantization and a codebook derived from training data) by feature extraction module 66. The feature vectors (or codewords) are provided to training module 65. Training module 65 also receives the phonetic transcriptions from the user input device. Training module 65 then uses the feature vectors (or codewords) in the training data, as well as the phonetic transcriptions, to build a set of monophone models, senone trees, triphone mapping memory, a prefix tree, and word duration models based on the training data. These items are all used by search engine 80 in performing recognition.

FIG. 4 is a flow diagram which illustrates the overall process by which training module 65 computes the monophone models, the senone trees and the triphone mapping memory. First, training module 65 receives the pooled training data. By pooled it is meant both the continuous and the isolated speech training data. This is indicated by block 108 in FIG. 4. The training data is converted to output distributions by feature extraction module 66, in the manner described above. Thus, training module 65 calculates one or more hidden Markov models for each word in the pooled training data using the feature vectors (or codewords), and the phonetic transcriptions provided to it. The hidden Markov models are associated with the phonemes found in the pooled training data and are calculated in a known manner based upon output and occurrence frequencies calculated for each phoneme.

In accordance with one preferred embodiment of the present invention, training module 65 models each phoneme found in the training data set as a monophone model. The monophone model includes an output probability distribution for each state in the model. This is indicated by blocks 110 and 112 in FIG. 4. The monophone models are used in the recognition scheme to determine a most likely matching phoneme for an input speech utterance before senone evaluation of the phoneme begins. The monophone models are then stored in memory 72 as indicated by block 113.

Then, for each state in each phoneme, training module 65 creates a senone tree. The technique by which a senone tree is created is described in greater detail with respect to FIG. 5. The creation of a senone tree is represented by block 114 in FIG. 4. The senone trees are then stored in memory 70 as indicated by block 116.

Once the senone trees are created, trainer 65 then maps all desired triphones (both seen and unseen in the training data) to senone sequences represented by the senone trees stored in memory 70. In order to do this, trainer 65 selects a desired triphone (a phoneme with corresponding right and left context) and traverses the senone trees stored in memory 70. As a result of traversing the senone trees, training module 65 obtains a senone corresponding to each state in the modeled triphone, and thus obtains a sequence of senones representing each triphone. This sequence of senones is mapped to the corresponding triphone in triphone mapping memory 74. This is indicated by block 118. The triphone mapping sequence is also described in greater detail with respect to FIG. 6.

Training module 65 then constructs a prefix tree and stores the prefix tree in memory 76. This is indicated by block 120. Finally, training module 65 calculates a word duration model and stores the word duration model in memory 78. This is indicated by block 122 in FIG. 4. Calculation of the word duration model is described in greater detail with respect to FIGS. 7 and 8.

After having calculated the monophone models, the senone trees, the triphone mapping, the prefix tree and the word duration models, system 60 is configured to perform speech recognition. The speech recognition task is described in greater detail in FIGS. 9 and 10.

Figure 5:
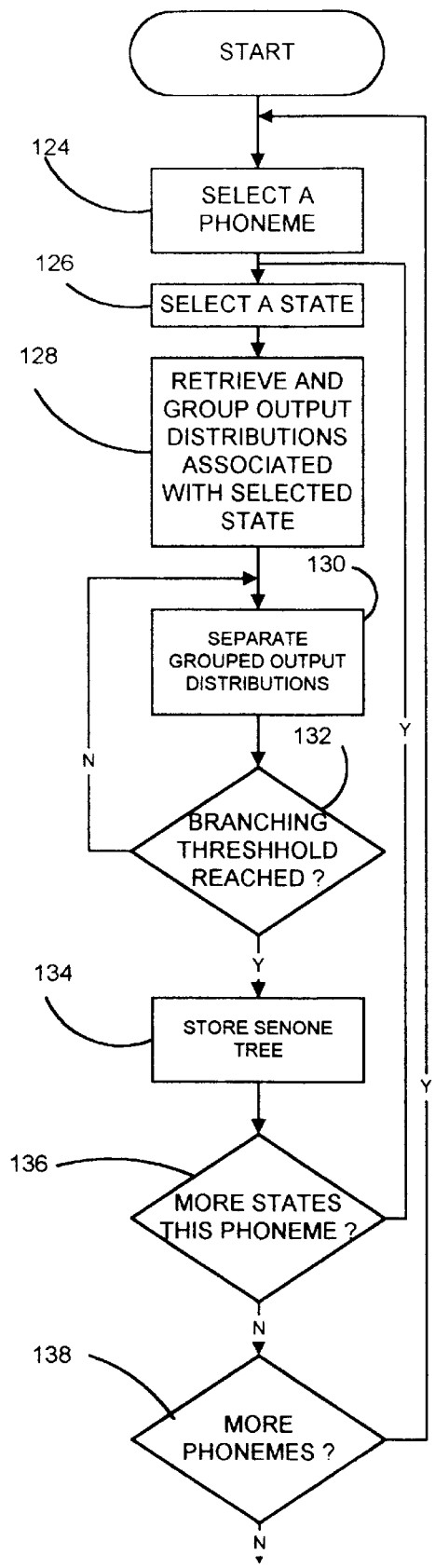
FIG. 5 is a flow diagram illustrating the creation of a senone tree in accordance with the present invention.

FIG. 5 is a flow diagram illustrating, in greater detail, the process by which training module 65 creates a senone tree for each state in each phoneme contained in the pooled training data. It is generally recognized that there are approximately 50 phonemes in the English language. In the preferred embodiment, each phoneme is associated with three states. Therefore, 150 senone trees must be created by training module 65. Also, in the preferred embodiment, each of the 50 phonemes will appear in the pooled training data (i.e., the continuous training data and isolated training data) in several different contexts. Thus, when the phoneme is modeled based on a three state hidden Markov model, the output distributions associated with each state in each of the hidden Markov models may be different, depending upon the context of the phoneme as it appears in the training data. Based on this information, a senone tree is built as described with respect to FIG. 5.

First, one of the 50 phonemes represented in the training data is selected. This is indicated by block 124. Then, the first state in the selected phoneme is selected, as indicated by block 126.

The output distributions associated with the selected state in the selected phoneme, for all occurrences of the phoneme in the pooled training data, are retrieved and grouped together. This is indicated by block 28. Then, the grouped output distributions for the selected state are separated from one another based upon linguistic, contextual questions. The questions are questions which seek linguistic information regarding the context of the particular phoneme for which the senone tree is being generated. Based upon the answer to the questions for each of the individual output distributions, those output distributions are separated from the first (parent) group into two (child) groups.

The method for choosing the proper linguistic questions is described in greater detail in U.S. patent application Ser. No. 08/850,061 entitled SENONE TREE REPRESENTATION AND EVALUATION, filed on May 2, 1997, and assigned to the same assignee as the present application, and which is hereby fully incorporated by reference. Briefly, the linguistic questions are preferably generated by an expert linguist and are designed to capture linguistic classes of contextual effects. For example, a set of 89 linguistic questions can be found in the article by Hon and Lee entitled CMU ROBUST VOCABULARY-INDEPENDENT SPEECH RECOGNITION SYSTEM, *IEEE Int'l Conf. On Acoustics, Speech and Signal Processing,* Toronto, Canada, 1991, pps 889–892. In order to split the parent group into child groups, training module 65 determines which of the numerous linguistic questions is the best question for the parent group. In a preferred embodiment, the best question is determined to be the question that gives the greatest entropy decrease between the parent group and the children groups. All of the linguistic questions are yes or no questions so two children nodes result from the division of the parent node.

The division of the groups stops according to a predetermined branching threshold. Such threshold may include, for instance, when the number of output distributions in a group falls below a predetermined value, or when the entropy decrease resulting from a group division falls below another threshold. When the predetermined branching threshold is reached, the resultant end groups are all leaf groups representing clustered output distributions, or senones. A single output distribution is selected based on the clustered output distribution to represent the senone. This is indicated by blocks 130 and 132. It should also be noted that the questions in the senone tree can be combined or conjoined to form composite questions. Further, composite questions can be disjoined for better composite questions, based upon the entropy decrease from the parent group to the children groups.

After the senone tree is created for the selected state of the selected phoneme, the senone tree is stored in memory 70. This is indicated by block 134. This process is repeated for each state of each phoneme in the vocabulary such that a senone tree is created for each state in each phoneme. This is indicated by blocks 136 and 138 in FIG. 5.

After a senone tree is created for each state of each phoneme in the vocabulary, each triphone to be recognized by system 60 must be mapped to a particular senone sequence. In other words, for each triphone to be recognized, an appropriate senone for each state in that triphone must be identified by traversing the appropriate senone trees stored in memory 70.

First, the phonetic transcriptions of each triphone to be recognized are received by system 60 from a user via a transcription input device, such as keyboard 40. Then, the senone tree corresponding to each state of the central phoneme of the triphone is traversed. The senone tree is traversed simply by answering the linguistic questions associated with the nodes of the senone tree. After an appropriate senone is identified for each successive state of the triphone, the identified senones are combined to form a senone sequence, which is mapped to that triphone in memory 74.

Figure 6:
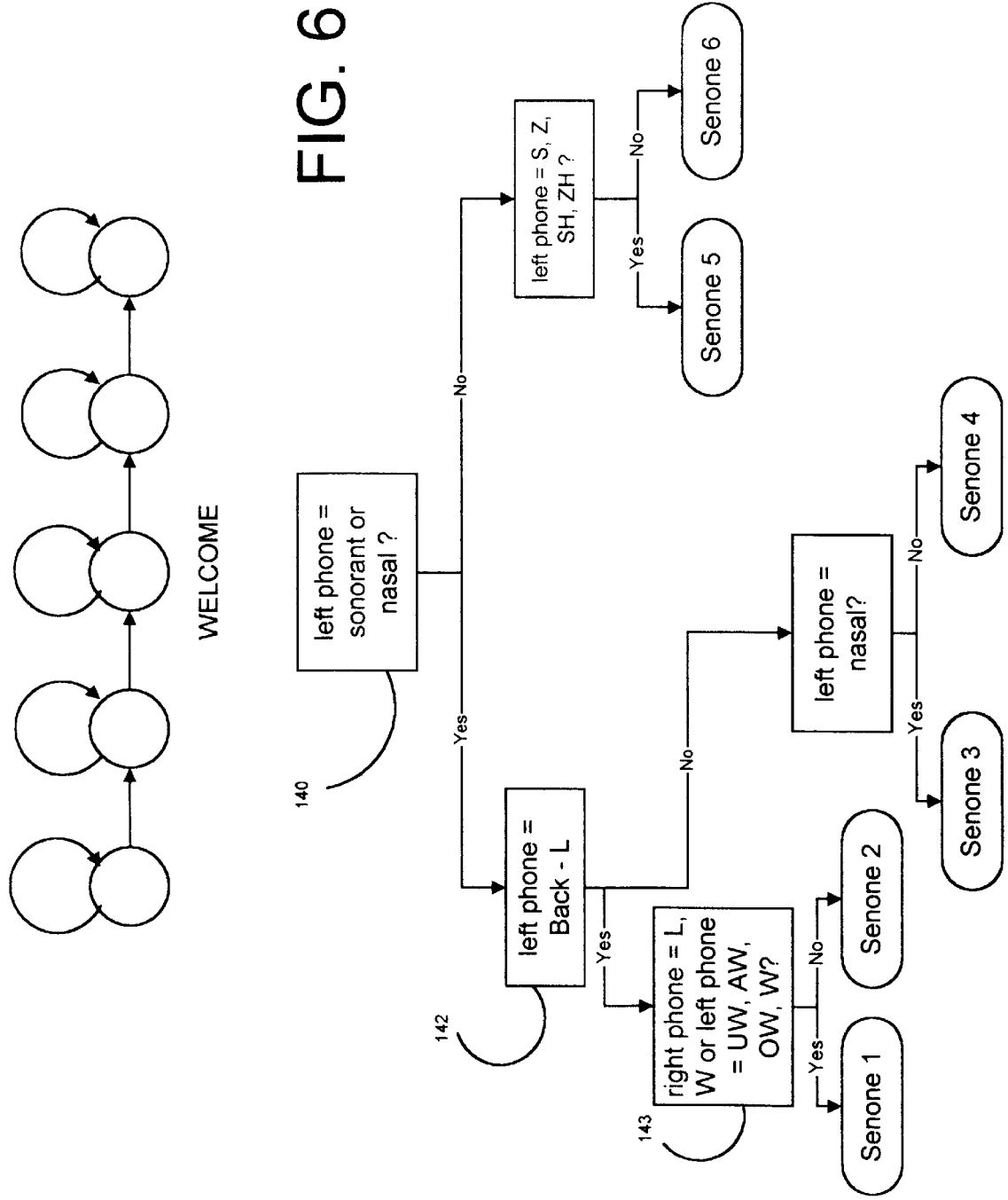
FIG. 6 is an illustration of a senone tree in accordance with the present invention.

FIG. 6 illustrates an example which is helpful in understanding how a senone tree is created and traversed. FIG. 6 illustrates a senone tree for the phoneme /K/ for the spoken sound of the letter "c" as part of the word "welcome". FIG. 6 shows the senone tree for the first state of the /K/ phoneme. It will be appreciated that many of the questions in the senone tree shown in FIG. 6 are composite questions, formed according to the techniques described above.

In order to determine the appropriate senone sequence for the triphone /L, K, UH/ formed by the letters "lco" of the word "welcome" each senone tree of the /K/ phoneme must be traversed. The senone tree shown in FIG. 6 is associated with the first state of the /K/ phoneme. The linguistic question associated with root node 140 is whether the left phone in the triphone is a sonorant or a nasal. Since the /L/ is a sonorant, the tree traversal moves to child node 142.

Child node 142 corresponds to a yes answer to the question posed at node 140. The question posed at node 142 asks whether the left phoneme (/L/) is a back phoneme (i.e., is the left phoneme a phoneme that is spoken with the tongue position toward the back of the mouth). The /L/ is a back phoneme, so the traversal proceeds to node 144, which corresponds to a yes answer to the question posed in node 142. Given that the right phone (the /UH/ phoneme of the triphone) is not an L or a W, and the /L/ phoneme is not any of the phonemes specified in the question posed by node 142, the answer to the question at node 142 is no. This leads to a senone, designated as senone 2, which is identified as the appropriate senone for the first state of the /L, K, UH/ triphone. A similar tree traversal proceeds for each of the other states of the /K/ phoneme. For all Markov states of all of the triphone models input into system 60, the corresponding senone tree is traversed until a leaf (or senone) is reached. The senone sequences defined for each triphone are stored in memory 70.

In the preferred embodiment in which the recognizer is based on a pronunciation prefix tree decoder, a prefix tree is then constructed to represent the vocabulary, or lexicon, to be recognized by system 60. The prefix tree is preferably constructed such that it can be traversed from a root node to a leaf to arrive at the word most likely indicative of the input data. In a preferred embodiment, the prefix tree includes a plurality of context dependent silence phones which are modeled (in a similar fashion to the monophone models stored in memory 72) such that silence is embedded as part of the words in the lexicon. After traversing the prefix tree, system 60 preferably maintains active hypotheses, which constitute the most likely words, or word sequences, recognized for any given phrase being recognized.

Figure 7:
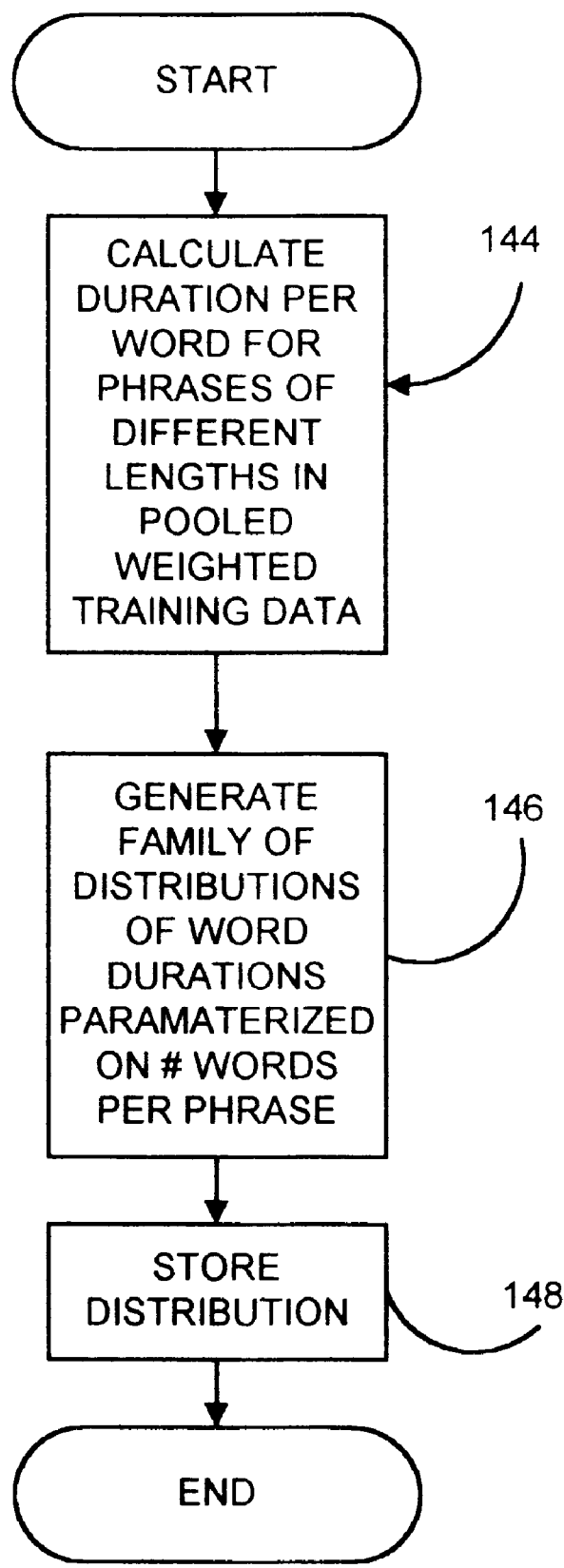
FIG. 7 is a flow diagram illustrating the creation of word duration models in accordance with the present invention.

System 60 then, in one preferred embodiment, constructs a plurality of word duration models which can be used to select among the active hypotheses which emerge from the prefix tree decoder. The word duration models are stored in memory 78. FIG. 7 is a flow diagram which illustrates the construction of the word duration models in greater detail.

The training data input into system 60 preferably contains isolated words of different duration, and word sequences (or phrases) which are separated by pauses, wherein the word sequences have a variety of different word counts per sequence. Training module 65 models the average duration of words in each discrete phrase having a word count n. Therefore, training module 65 first calculates the average duration per word for phrases of different lengths in the pooled training data (this includes phrases having a length of one word). This is indicated by block 144 in FIG. 7. Next, training module 65 generates a family of distributions of word durations, parameterized by the number of words per phrase. This is indicated by block 146. Training module 65 then stores the family of distributions in word duration model memory 78. This is indicated by block 148.

Figure 8:
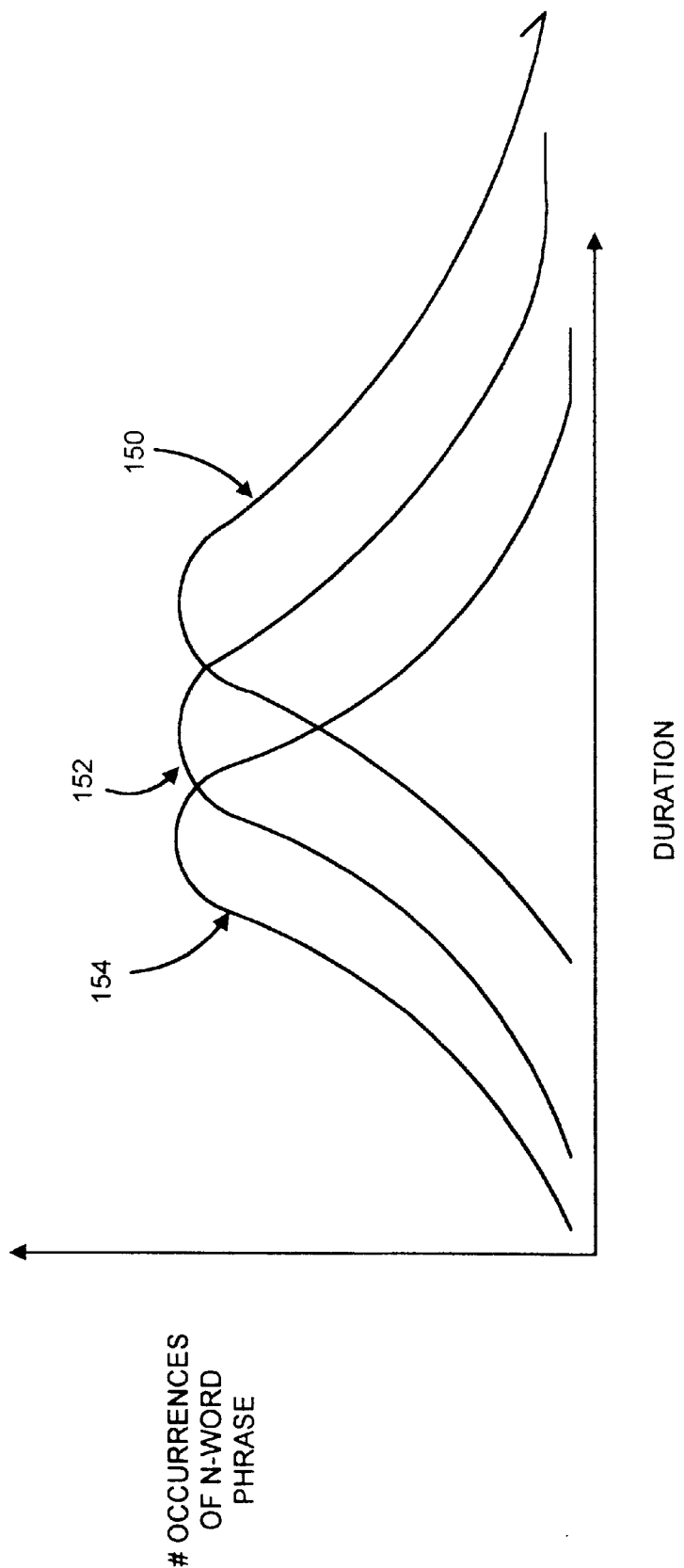
FIG. 8 is a graphical illustration of a plurality of word duration models created in accordance with a procedure shown by FIG. 7.

FIG. 8 is a graph which more clearly illustrates a family of distributions calculated by training module 65. FIG. 8 shows three distributions 150, 152 and 154 plotted on a graph which has word duration on the x-axis and the number of occurrences of n-word phrases on the y-axis. Distributions 150, 152 and 154 are generally in the form of gamma distributions wherein distribution 150 is associated with the average duration of one word phrases, distribution 152 is associated with the average duration of each word in a two-word phrases, and distribution 154 is associated with the average word duration of each word in an n-word phrases (where n is an integer greater than 2). Thus, FIG. 8 graphically illustrates that the average duration of each word in a one-word phrase is slightly longer than the average duration of each word in a two-word phrase. Also, where the number of words in a phrase exceeds two, the average duration of each word in such a phrase is slightly shorter than the average duration of the words in either a one-word or a two-word phrase.

During recognition, the average word durations in the active hypotheses retained after traversing the prefix tree are compared against the word duration models computed by training module 65. Each hypothesis is then assigned a score (or penalized) based upon whether the average duration per word in that particular hypothesis closely matches (or does not closely match) the appropriate word duration model. This is described in greater detail later in the specification.

Once training module 65 has developed the monophone models, the senone trees, the triphone mapping, the prefix tree, and the word duration models, system 60 is appropriately configured to recognize speech.

Figure 9:
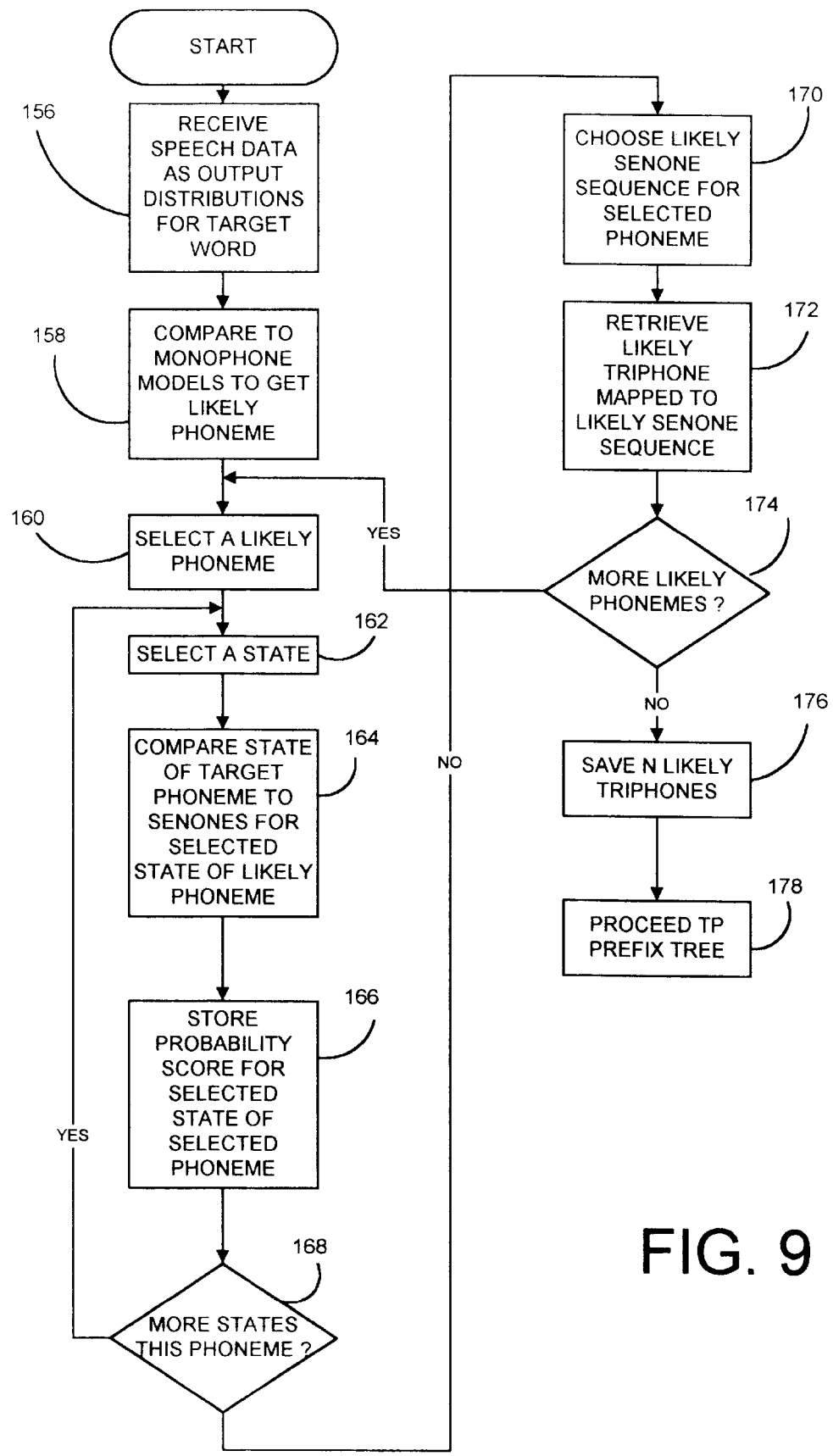
FIG. 9 is a flow diagram illustrating a portion of a speech recognition procedure in accordance with one aspect of the present invention.

FIG. 9 is a flow diagram illustrating one preferred technique for recognizing speech with system 60. Speech is first input into system 60 in the form of an audible voice signal provided by the user to microphone 62. Microphone 62 converts the audible speech signal into an analog electronic signal which is provided to A/D converter 64. A/D converter 64 converts the analog speech signal into a sequence of digital signals which is provided to feature extraction module 66. In a preferred embodiment, feature extraction module 66 is a conventional array processor which performs spectral analysis on the digital signals and computes a magnitude value for each frequency band of a frequency spectrum. The signals are, in one preferred embodiment, provided to feature extraction module 66 by A/D converter 64 at a sample rate of approximately 16 kilohertz, wherein A/D converter 64 is implemented as a commercially available, well known A/D converter.

Feature extraction module 66 divides the digital signals received from A/D converter 64 into frames which include a plurality of digital samples. Each frame is approximately 10 milliseconds in duration. Each frame is then preferably encoded by feature extraction module 66 into a feature vector reflecting the spectral characteristics for a plurality of frequency bands. The feature extraction module 66 might further encode the feature vector to codewords based on vector quantization technique and codebooks derived from training data (not individually shown). Output distributions can be computed against hidden Markov models using the feature vector (or codewords) of the particular frame being analyzed. The feature extraction module 66 preferably provides the feature vectors (codewords) at a rate of one set approximately every 10 milliseconds.

As feature extraction module 66 is processing the digital samples from A/D converter 64, silence (or boundary) detection module 68 is also processing the samples. Silence detection module 68 can either be implemented on the same, or a different, processor as that used to implement the feature extraction module 66. Silence detection module 68 operates in a well known manner. Briefly, silence detection module 68 processes the digital samples provided by A/D converter, so as to detect silence (or pauses) in order to determine boundaries between words and phrases being uttered by the user. Silence detection module 68 then provides the boundary detection signal to search engine 80 which is indicative of the detection of a word or phrase boundary. Thus, search engine 80 receives speech data in the form of output distributions associated with target words to be recognized. This is indicated by block 156 in FIG. 9.

Search engine 80 then compares the output distributions received to the monophone models stored in monophone memory 72. For each successive target phoneme of the spoken target word, and for each successive target state of the target phoneme, search engine 80 compares the output distribution for the target state with a corresponding state of each phoneme monophone model stored in memory 72. Search engine 80 then selects a predetermined number of phoneme monophone models whose states most closely match the output distribution of the target states, to obtain likely phonemes represented by the target phoneme. This is represented by block 158 in FIG. 9.

Search engine 80 then selects one of the likely phonemes, and selects the first state in that phoneme. This is indicated by blocks 160 and 162. Search engine 80 then retrieves the senones generated by the senone tree for the selected state.

Next, search engine 80 compares the target output distribution of the first target state with each senone of the senone tree corresponding to the first state of the selected phoneme model. Search engine 80 then selects whichever senone mostly closely matches the output distribution of the target state as the best matching senone, and computes and stores a matching probability score for the best matching senone. This is indicated by blocks 164 and 166.

If the selected phoneme has more than one state, search engine 80 performs the same steps for each remaining state in the selected phoneme. Thus, search engine 80 selects a most closely matching senone for each state in the selected phoneme and computes and stores a matching probability score for the best matching senone. This is indicated by block 168. After all states in the selected phoneme have been compared, search engine 80 will have identified a likely senone sequence for the selected phoneme based upon the probability scores determined. This is indicated by block 170. Search engine 80 then accesses the information stored in memory 74 and retrieves a likely triphone which has been mapped to the likely senone sequence determined. This is indicated by block 172.

Search engine 80 then determines whether all of the likely phonemes have been processed. If not, search engine 80 repeats the process and arrives at a likely senone sequence for each likely phoneme (and thus arrives at N likely triphones to be associated with the target phoneme) based upon the probability scores determined during comparison. This is indicated by blocks 174 and 176.

Once the N likely triphones have been identified, search engine 80 accesses the prefix tree in memory 76. After traversing the prefix tree, search engine 80 identifies active-hypotheses. In one preferred embodiment, search engine 80 then simply accesses a lexicon and a language model, such as a 60,000 word trigram language model derived from the North American Business News Corpus and set out in greater detail in a publication entitled *CSR - III Text Language Model*, University of Pennsylvania, 1994, and published by the Linguistic Data Consortium. The language model is used to identify the most likely word or word sequence represented by the input data, and this is provided by search engine 80 to output device 82.

Figure 10:
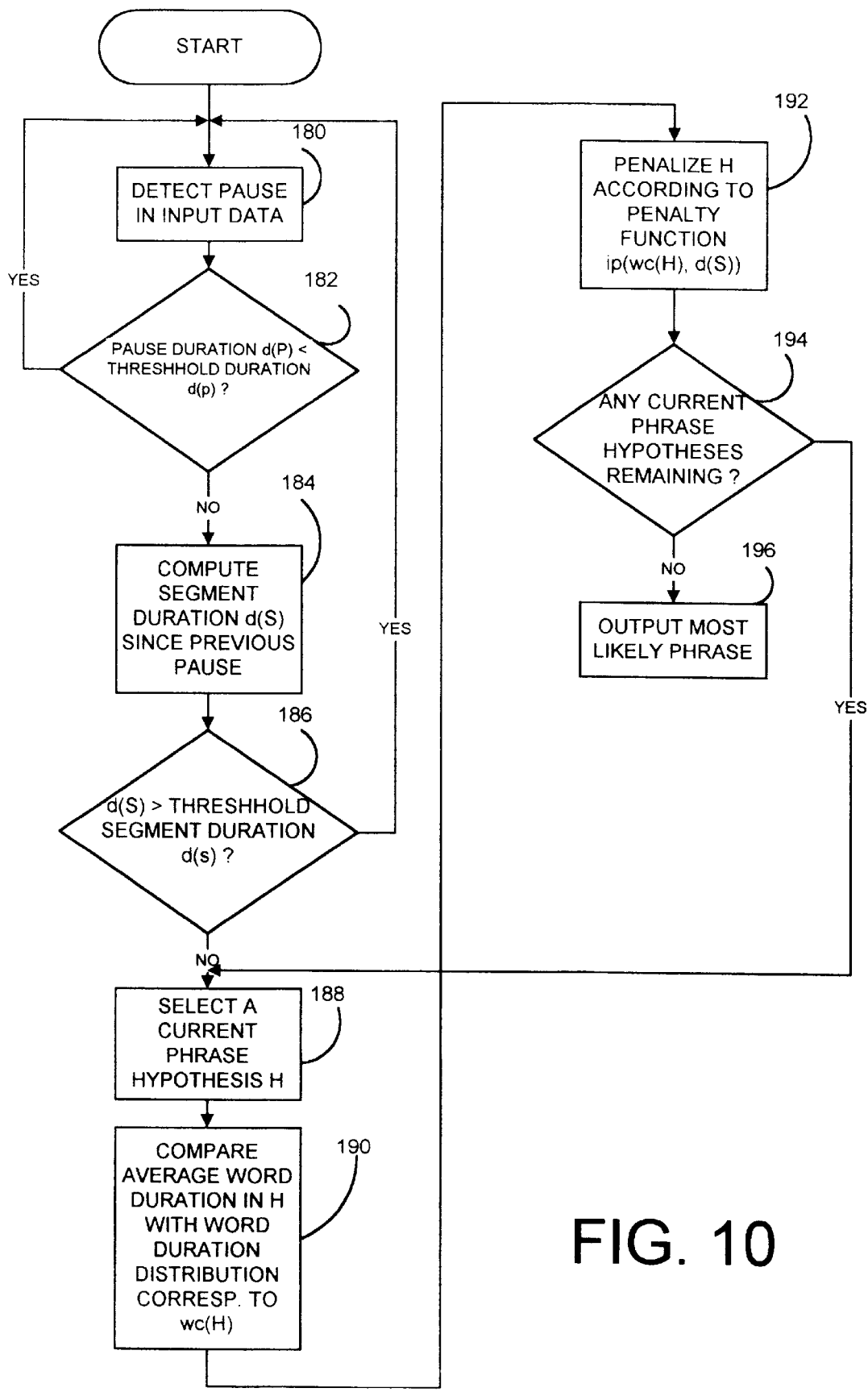
FIG. 10 is a flow diagram illustrating the application of a word duration model in accordance with one aspect of the present invention.

However, in accordance with another aspect and another preferred embodiment of the present invention, search engine 80 also utilizes the word duration models in memory 78 to more accurately identify the most likely word or word sequences represented by the input data. FIG. 10 is a flow diagram illustrating how the duration models are used to discriminate between multi-word phrases and single word phrases. For the purposes of this description, a discrete phrase of word count X is a sequence of Y fluently spoken words beginning and ending with silence.

The application of the duration models is preferably performed at the boundaries of discrete phrases. Phrases are detected by detecting pauses in the input data. First, a pause in the input data is detected by silence detection module 68. This is indicated by block 180. Next, search engine 80 determines whether the pause detected has a duration d(P) which is less than a threshold duration d(p). The threshold duration d(p) is empirically determined, based on the training data, to avoid the detection of false pauses, or pauses which do not accurately reflect a boundary between phrases. This is indicated by block 182. If d(P) is less than d(p), then processing reverts to block 80, and another pause detection is awaited.

However, if d(P) is not less than d(p), then search engine 80 computes the phrase duration (or segment duration) d(S) which is indicative of the duration between the present pause, and the most recent previous pause which was in excess of the threshold duration d(p). This is indicated by block 184. Search engine 80 then determines whether the segment duration d(S) is greater than a threshold segment duration d(s). As with d(p), d(s) is empirically determined based on the training data to ensure that the segment duration d(S) is not so long that the heuristic should not be applied. In other words, it is believed that the word duration model can be most effective when applied to phrases of shorter duration, than to phrases of quite long duration. If the segment duration d(S) is greater than the segment threshold d(s), then processing reverts to block 180 where another pause detection is awaited.

However, if d(S) is less than the threshold segment duration d(s), then search engine 80 selects a current phrase hypothesis H which is indicative of one of the n-most likely words or word phrases represented by the input data. This is indicated by block 188. Search engine 80 then determines the word count in H (wc(H)) and computes the average duration of each word in H based on wc(H) and d(S) and compares that to the word duration distribution, stored in memory 78, corresponding to a phrase having a word count equal to wc(H). This is indicated by block 190.

Based on the comparison, search engine 80 then assigns a score to that hypothesis H (or a penalty) according to a function ip(wc(H), d(S)) which is indicative of how closely the average word duration in H matches the corresponding word duration model. In a preferred embodiment, ip(wc(H), d(S)) is a gradient descent function which is found empirically based on the training data input into system 60. This is indicated by block 192. Search engine 80 repeats this process for each of the active-hypotheses, as indicated by block 194, and uses this information in selecting the most likely hypothesis. Search engine 80 then provides the most likely hypothesis to output device 82 as the most likely phrase represented by the input data. This is indicated by blocks 194 and 196.

Therefore, it can be seen that the present invention provides significant advantages over prior systems. The present invention uses a data collection method which collects both isolated speech data, and continuous speech data as the training data set. By augmenting the normal data collection method so that the reader is required to pause between words, as well as speak fluently, silence contexts associated with discrete speech are also used in training the acoustic models in the system, as well as non-silence associated with continuous speech. It should be noted that the training data for the continuous speech training data and the isolated speech training data can contain either the same or different words. This pooled training data set is used in training the phoneme models, generating the senone trees and training the senones, and in mapping triphones to the appropriate senone sequences.

It should also be noted that the effect of the different types of training data (continuous and isolated) can be weighted differently according to the type of speech expected during recognition. This is indicated by optional block 109 in FIG. 4. The weighting can be accomplished either by assigning a weighting coefficient, or simply by the amount of each type of data provided to the system in the training data set. In one preferred embodiment, both types of training data are equally weighted.

Further, in one preferred embodiment, the present invention employs word duration models. The word duration models are preferably developed during training and are applied at phrase boundaries to even further increase the accuracy of the recognition system.

The present techniques can also be used to introduce other types of training data into the system as well. This is indicated by optional block 107 in FIG. 4. For instance, not only can the user be directed to input the training data as isolated and continuous speech, but the user can also be directed to input the training data loudly, softly, more slowly, or more quickly, or with other variations. All of this training data can then be used, in a similar fashion to that described above, to train the acoustic models used in the system to obtain even a more robust recognition system.

Although the present invention has been described with reference to preferred embodiments, workers skilled in the art will recognize that changes may be made in form and detail without departing from the spirit and scope of the invention.

What is claimed is:

1. A method of implementing a speech recognition system, comprising:

receiving isolated speech training data indicative of a plurality of discretely spoken training words;

receiving continuous speech training data indicative of a plurality of continuously spoken training words;

providing a plurality of speech unit models including output probability distributions representative of speech units in the continuous and isolated speech training data, the models being trained based on both the isolated speech training and the continuous speech training data; and providing a recognizer to recognize speech based on the speech unit models trained.

2. The method of claim 1 wherein receiving the isolated speech training data includes receiving a first plurality of acoustic signals, wherein receiving continuous speech training data includes receiving a second plurality of acoustic signals, and wherein providing a plurality of speech unit models comprises:

developing a plurality of acoustic models based on the first and second plurality of acoustic signals.

3. The method of claim 2 wherein developing a plurality of acoustic models comprises:

developing a plurality of output probability distributions representative of phonemes in the continuous and isolated speech training data based on the first and second plurality of acoustic signals.

4. The method of claim 3 wherein providing a plurality of speech unit models further comprises:

associating each of the output distributions with one of a predetermined number of states in a phoneme forming at least part of one of the training words.

5. The method of claim 4 and further comprising:

for each phoneme, grouping output distributions associated with a selected phoneme from all of the training words containing the selected phoneme to form an output distribution group; and for each state in each phoneme, creating a senone tree for a selected state in the selected phoneme by separating the output distributions associated with the selected state in the output distribution group into senones based on linguistic context information associated with the selected phoneme.

6. The method of claim 5 wherein providing a recognizer for recognizing speech comprises configuring the speech recognizer to perform the steps of:

receiving an output distribution for each successive state of each successive target phoneme in a target word to be recognized;

for each target phoneme, identifying a number of likely phonemes which are most likely representative of the target phoneme;

comparing senones associated with the states of the likely phonemes with the output distributions associated with corresponding states of the target phoneme; and identifying a most likely phoneme having senones that most closely match the output distributions of the target phoneme.

7. The method of claim 6 wherein comparing comprises:

traversing the senone tree associated with each state in each likely phoneme, based on linguistic context information of the target phoneme, to identify a senone for each state in the target phoneme; and comparing the output distribution associated with the state in the target phoneme with the output distribution associated with the identified senone in the likely phoneme.

8. The method of claim 6 wherein identifying a number of likely phonemes comprises:

forming a plurality of monophone models, based on the isolated speech training data and the continuous speech training data, indicative of phonemes in the training words;

comparing the output distributions associated with the target phoneme to the monophone models; and identifying a number of likely phonemes having monophone models which closely match the output distributions associated with the target phoneme.

9. The method of claim 1 wherein receiving isolated speech training data comprises:

receiving isolated speech data which includes silence context information associated with a plurality of discretely spoken training words.

10. The method of claim 9 wherein receiving isolated speech data comprises:

receiving the isolated speech data indicative of a user speaking the plurality of training words discretely, with pauses between each of the plurality of training words.

11. The method of claim 1 wherein receiving continuous speech training data comprises:

receiving continuous speech data indicative of a user speaking a plurality of training words fluently.

12. The method of claim 1 and further comprising:

weighting the continuous speech training data and the isolated speech training data, prior to training the speech unit models, based on expected speech to be recognized.

13. The method of claim 1 and further comprising:

receiving additional speech training data indicative of a user speaking a plurality of training words in different styles.

14. The method of claim 13 wherein receiving additional speech training data comprises:

receiving the additional speech training data indicative of the user speaking the plurality of training words at a first amplitude and at a second amplitude, the second amplitude being larger than the first amplitude.

15. The method of claim 13 wherein receiving additional speech training data comprises:

receiving the additional speech training data indicative of the user speaking the plurality of training words fluently, at a first pace, and at a second pace, the second pace being faster than the first pace.

16. The method of claim 1 and further comprising:

providing a plurality of word duration models based on the isolated speech training data and the continuous speech training data indicative of an approximate word duration of words contained in word phrases of varying length, the length being defined by a word count in the word phrases.

17. The method of claim 16 wherein providing a speech recognizer to recognize speech comprises configuring the recognizer to perform the steps of:

receiving a plurality of target words to be recognized;

detecting phrase boundaries indicative of target word phrases in the target words;

determining an approximate duration of the target word phrases;

obtaining a plurality of word phrase hypotheses indicative of likely word phrases represented by the target word phrases;

determining approximate word counts and durations for words in the word phrase hypotheses; and comparing the word durations for the words in the word phrase hypotheses with word duration models having a word count equal to the number of words in the word phrase hypotheses to obtain a likely word phrase hypothesis based on how closely the word duration in the word phrase hypotheses match the word duration models.

18. The method of claim 16 wherein providing a plurality of word duration models comprises:

detecting training word phrases in the isolated speech training data and the continuous speech training data;

determining a number of words in the training word phrases;

determining an approximate word duration for the words in a plurality of the training word phrases detected; and determining a plurality of word duration distributions parameterized on the number of words in the training word phrases and the duration of the words in the training word phrases.

19. A method of recognizing speech, comprising:

receiving input data indicative of the speech to be recognized;

detecting pauses in the speech, based on the input data, to identify a phrase duration;

generating a plurality of phrase hypotheses representative of likely word phrases represented by the input data between the pauses detected;

comparing a word duration associated with each word in each phrase hypothesis, based on a number of words in the phrase hypothesis and based on the phrase duration, with an expected word duration for a phrase having a number of words equal to the number of words in the phrase hypothesis; and assigning a score to each phrase hypothesis based on the comparison of the word duration with the expected word duration to obtain a most likely phrase hypothesis represented by the input data.

20. The method of claim 19 and further comprising:

receiving training data indicative of words to be recognized;

detecting pauses in the training data to identify a plurality of training word phrases;

determining a number of words in each of the training word phrases;

generating a plurality of distributions of word durations corresponding to the training word phrases based on a number of words in each of the training word phrases.

21. The method of claim 20 wherein comparing a word duration in each phrase hypothesis with an expected word duration comprises:

for each hypothesis, determining a word duration for the words in the hypothesis based on the number of words in the hypothesis and the phrase duration;

choosing a selected one of the plurality of distributions associated with a number of words per phrase equal to the number of words in the hypothesis; and comparing the word duration determined for the hypothesis to the selected distribution.

22. The method of claim 21 wherein assigning a score to each phrase hypothesis comprises:

assigning a score to each word hypothesis indicative of how closely the word duration determined for the hypothesis matches the selected distribution.

23. A method of performing speech recognition, comprising:

receiving isolated speech training data indicative of a plurality of discretely spoken training words, the isolated speech training data including a first plurality of output distributions, each output distribution being associated with one of a predetermined number of states in a phoneme forming at least part of one of the discretely spoken training words;

receiving continuous speech training data indicative of a plurality of continuously spoken training words, the continuous speech training data including a second plurality of output distributions, each of the second plurality of output distributions being associated with one of a predetermined number of states in a phoneme forming at least part of one of the continuously spoken training words;

grouping output distributions associated with a selected phoneme from all of the training words containing the selected phoneme to form an output distribution group; and creating a senone tree for a selected state in the selected phoneme by separating the output distributions associated with the selected state in the output distribution group based on linguistic context information associated with the selected phoneme.

* * * * *

UNITED STATES PATENT AND TRADEMARK OFFICE
CERTIFICATE OF CORRECTION

PATENT NO. : 6,076,056
DATED : June 13, 2000
INVENTOR(S) : Huang et al.

It is certified that error appears in the above-identified patent and that said Letters Patent is hereby corrected as shown below:

Column 8, line 45, "28" should be --128--.

Signed and Sealed this

Twenty-second Day of May, 2001

*Attest:*

NICHOLAS P. GODICI

*Attesting Officer*   Acting Director of the United States Patent and Trademark Office